US009015176B2

(12) United States Patent
Cava (10) Patent No.: US 9,015,176 B2
(45) Date of Patent: *Apr. 21, 2015

(54) AUTOMATIC IDENTIFICATION OF RELATED SEARCH KEYWORDS

(75) Inventor: William Cava, New Boston, NH (US)

(73) Assignee: Lycos, Inc., Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/608,633

(22) Filed: Sep. 10, 2012

(65) Prior Publication Data

US 2013/0006958 A1    Jan. 3, 2013

Related U.S. Application Data

(63) Continuation of application No. 11/371,211, filed on Mar. 8, 2006, now Pat. No. 8,266,162.

(60) Provisional application No. 60/732,021, filed on Oct. 31, 2005.

(51) Int. Cl.
*G06F 17/30* (2006.01)
*G06F 7/00* (2006.01)

(52) U.S. Cl.
CPC .... *G06F 17/30864* (2013.01); *G06F 17/30672* (2013.01); *G06F 17/3064* (2013.01); *G06F 17/3089* (2013.01); *G06F 17/30867* (2013.01)

(58) Field of Classification Search
CPC ............ G06F 17/30864; G06F 17/30867; G06F 17/3089; G06F 17/27; G06F 17/2735; G06F 17/2785
USPC .................. 707/755, 758, 803, 769
See application file for complete search history.

(56) References Cited

U.S. PATENT DOCUMENTS

| | | | |
|---|---|---|---|
| 5,701,461 A | 12/1997 | Dalal et al. | |
| 5,857,201 A | 1/1999 | Wright et al. | |
| 6,006,225 A | 12/1999 | Bowman et al. | |
| 6,144,958 A | 11/2000 | Ortega et al. | |
| 6,286,005 B1 | 9/2001 | Cannon | |
| 6,327,590 B1 | 12/2001 | Chidlovskii et al. | |
| 6,397,212 B1 | 5/2002 | Biffar | |
| 6,654,725 B1 | 11/2003 | Langheinrich et al. | |
| 6,691,108 B2 | 2/2004 | Li | |
| 6,898,591 B1 | 5/2005 | Moon et al. | |
| 6,983,272 B2 | 1/2006 | Davis et al. | |
| 7,007,014 B2* | 2/2006 | Liu et al. ................ | 707/758 |
| 7,043,450 B2 | 5/2006 | Velez et al. | |
| 7,047,242 B1 | 5/2006 | Ponte | |
| 7,062,510 B1 | 6/2006 | Eldering | |
| 7,072,888 B1 | 7/2006 | Perkins | |
| 7,076,443 B1 | 7/2006 | Emens et al. | |

(Continued)

OTHER PUBLICATIONS

He et al., "Combining evidence for automatic Web session identification," Information Processing and Management, 2002.

(Continued)

*Primary Examiner* — Kuen Lu
(74) *Attorney, Agent, or Firm* — Fish & Richardson P.C.

(57) ABSTRACT

Keyword expansion is used to expand a particular keyword into multiple related keyword candidates using a collection of data that relates to search queries performed using one or more search engines. The data identifies search terms from associated search queries. A particular keyword is identified and one or more candidate keywords related to the particular keyword are identified based on the data.

18 Claims, 4 Drawing Sheets

(56) References Cited

U.S. PATENT DOCUMENTS

| | | | |
|---|---|---|---|
| 7,076,479 | B1 | 7/2006 | Cheung et al. |
| 7,139,755 | B2 * | 11/2006 | Hammond ................ 707/767 |
| 7,346,615 | B2 | 3/2008 | Bem |
| 7,636,714 | B1 * | 12/2009 | Lamping et al. .................. 1/1 |
| 2002/0116457 | A1 | 8/2002 | Eshleman et al. |
| 2002/0137540 | A1 | 9/2002 | Yu |
| 2003/0069874 | A1 | 4/2003 | Hertzog et al. |
| 2003/0097358 | A1 | 5/2003 | Mendez |
| 2003/0110190 | A1 | 6/2003 | Achiwa et al. |
| 2003/0200282 | A1 | 10/2003 | Arnold et al. |
| 2004/0260621 | A1 | 12/2004 | Foster et al. |
| 2005/0060311 | A1 | 3/2005 | Tong et al. |
| 2005/0071741 | A1 | 3/2005 | Acharya et al. |
| 2005/0102282 | A1 * | 5/2005 | Linden ........................ 707/3 |
| 2005/0137939 | A1 * | 6/2005 | Calabria et al. ............ 705/26 |
| 2005/0149396 | A1 | 7/2005 | Horowitz et al. |
| 2005/0160460 | A1 * | 7/2005 | Fujiwara et al. ............ 725/52 |
| 2005/0216335 | A1 | 9/2005 | Fikes et al. |
| 2005/0240580 | A1 * | 10/2005 | Zamir et al. .................. 707/4 |
| 2006/0004730 | A1 | 1/2006 | Chan |
| 2006/0047703 | A1 | 3/2006 | Strober et al. |
| 2006/0149625 | A1 * | 7/2006 | Koningstein ................ 705/14 |
| 2006/0248035 | A1 | 11/2006 | Gendler et al. |
| 2007/0038602 | A1 | 2/2007 | Weyand et al. |
| 2007/0136251 | A1 * | 6/2007 | Colledge et al. ............. 707/3 |

OTHER PUBLICATIONS

Huang et al., "Relevant Term Suggestion in Interactive Web Search Based on Contextual Information in Query Session Logs," Wiley Periodicals, Inc., 2003.

Ozmutlu et al., "Application of automatic topic identification on Excite Web search engine data logs," Information Processing and Management, 2005.

Office Action from co-pending U.S. Appl. No. 11/371,209 dated May 29, 2008.

Office Action from co-pending U.S. Appl. No. 11/371,209 dated Mar. 19, 2009.

Amendment in Reply to Action of Nov. 16, 2011 from U.S. Appl. No. 11/371,211, filed Jan. 19, 2012.

Office Action from U.S. Appl. No. 11/371,211, dated Nov. 16, 2011.

Amendment in Reply to Action of Jul. 22, 2010 from U.S. Appl. No. 11/371,211, filed Jan. 24, 2011.

Final Office Action from U.S. Appl. No. 11/371,211, dated Jul. 22, 2010.

Amendment in Reply to Action of Oct. 6, 2009 from U.S. Appl. No. 11/371,211, filed Apr. 6, 2010.

Office Action from U.S. Appl. No. 11/371,211, dated Oct. 6, 2009.

Amendment in Reply to Action of Feb. 23, 2009 from U.S. Appl. No. 11/371,211, filed Mar. 26, 2009.

Final Office Action from U.S. Appl. No. 11/371,211, dated Feb. 23, 2009.

Amendment in Reply to Action of Jun. 4, 2008 from U.S. Appl. No. 11/371,211, filed Nov. 12, 2009.

Office Action from U.S. Appl. No. 11/371,211, dated Jun. 4, 2008.

He et al. "Combining evidence for automatic Web session identification," Information Processing and Management, 2002.

Huang et al. "Relevant Term Suggestion in Interactive Web Search Based on Contextual Information in Query Session Logs," Wiley Periodicals, Inc., 2003.

Office Action from U.S. Appl. No. 11/371,209 dated May 29, 2008.
Office Action from U.S. Appl. No. 11/371,209 dated Mar. 19, 2009.
Office Action from U.S. Appl. No. 11/371,211, dated Jul. 22, 2010.
Office Action from U.S. Appl. No. 11/371,211, dated Feb. 23, 2009.
Amendment in Reply to Action of Jun. 4, 2008 from U.S. Appl. No. 11/371,211, filed Nov. 12, 2008.

* cited by examiner

FIG. 4

AUTOMATIC IDENTIFICATION OF RELATED SEARCH KEYWORDS

CLAIM OF PRIORITY

This application is a continuation of and claims priority under 35 U.S.C. §120 to U.S. patent application Ser. No. 11/371,211, filed Mar. 8, 2006, now U.S. Pat. No. 8,266,162 which claims priority under 35 USC §119(e) to U.S. Patent Application Ser. No. 60/732,021, filed on Oct. 31, 2005, the entire contents of each of which are hereby incorporated by reference.

TECHNICAL FIELD

This description relates to enhancing search engine capabilities, and more particularly to automatically identifying search keywords that relate to a particular keyword.

BACKGROUND

Typical Internet search engine websites, such as one provided by Lycos, Inc., enable users to conveniently locate websites relating to a particular topic without having to know a uniform resource locator (URL) for the website. In particular, a user enters search terms as a query to a search engine and receives a list of results, typically in the form of hyperlinks to each identified website along with a title, description, and/or an excerpt of the website. Search engine websites generally use proprietary algorithms for performing automated searching and/or indexing of documents available over the Internet. The purpose of such algorithms is generally to locate web documents that are relevant in the context of a particular query based on the content of the web documents. Accordingly, results can be ranked and presented to the user in an order of relevance, as determined by the particular proprietary algorithm.

Many Internet search engines also provide predetermined results based on the search terms included in the query and without explicitly considering the content of the web documents included in the results. For example, the results of a search may include sponsored links or other paid listings that are based on an inclusion in the search of a particular keyword or keywords. Typically, an advertiser bids or pays a preset fee to be displayed as a sponsored link for searches that include a particular keyword or keywords. In many cases, advertisers bid based on a pay-per-click model, in which the advertiser only pays when its link in a search results list is clicked.

The efficiency of a paid listing for a website is dependent upon the selection of one or more keywords that are most likely to be used by consumers to which the website is targeted. For example, a website operator may want its website to appear as a paid listing in response to search queries submitted by consumers who are actually searching for the content of the website or some closely related content. Keywords can be selected by identifying a small number of highly relevant search terms and using a keyword expansion technique. Conventional keyword expansions are lexicographical and use thesauruses, dictionaries, and other linguistic resources to identify alternative search terms with the same or similar meanings.

SUMMARY

Keyword expansions can be extended and enhanced by collecting data relating to search queries submitted to a search engine and using collaborative filtering to identify words and phrases that are used in similar circumstances as a particular "seed" keyword. As a result, keyword expansions can be performed that identify keyword candidates based on conceptual similarities In one general aspect, keyword candidates are identified by collecting data relating to search queries performed using one or more search engines. The data identifies search terms from search queries associated with one another. A particular keyword is identified, and, based on the data, a list of one or more candidate keyword related to the particular keyword is generated.

Implementations can include one or more of the following features. An association between search queries is determined by identifying search queries performed within a search session. A set of search queries included in the search session is identified based on each of the search queries in the set being received from a particular location and/or within a predetermined time. The particular location can be determined based on an originating address associated with each of the search queries in the set or based on data stored on a device from which each search query originates. An association between search queries can be determined by identifying search queries with related elements.

The one or more candidate keywords can include a search term included in a search query associated with one or more search queries that include the particular keyword. The candidate keywords can be identified by identifying different stems of a base term, identifying possible misspellings of a term, or analyzing the data for patterns of similar search tendencies. Candidate keywords can also be rated based on an identification of search term usage trends or a cost associated with each candidate keyword. Data identifying associations between different search terms can be aggregated based on received search queries, and the candidate keywords can be determined based on the aggregated data. Information relating to usage trends among the different search terms can also be collected and used to identify candidate keywords by, for example, weighting the candidate keywords based on a cost relating to associating each candidate keyword with predetermined information.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

In general, keyword expansions involve selecting an initial keyword or keywords and identifying one or more other related or potentially related keywords. Keywords can include terms that are used to index data and terms that are used as criteria for a search. Among other things, keywords can include meta tags included in web pages and terms that are used to search for the meta tags. A meta tag is a tag (i.e., a coding statement) in the Hypertext Markup Language (HTML) that describes some aspect of the contents of a Web page. While conventional keyword expansions use lexicographical techniques, conceptual keyword expansions identify keywords that relate to the same underlying concept without being limited to lexicographical tools such as thesauruses and dictionaries. Here a concept is a general idea derived or inferred from specific instances or occurrences. Keywords that relate to the same concept can be identified by analyzing search patterns (e.g., repeated behaviors or tendencies) across a pool of users. For example, different users will tend to use the same or similar search terms when searching for information on a particular subject. Such information can be used to identify relationships and associations between different keywords that are not otherwise apparent.

Figure 1:
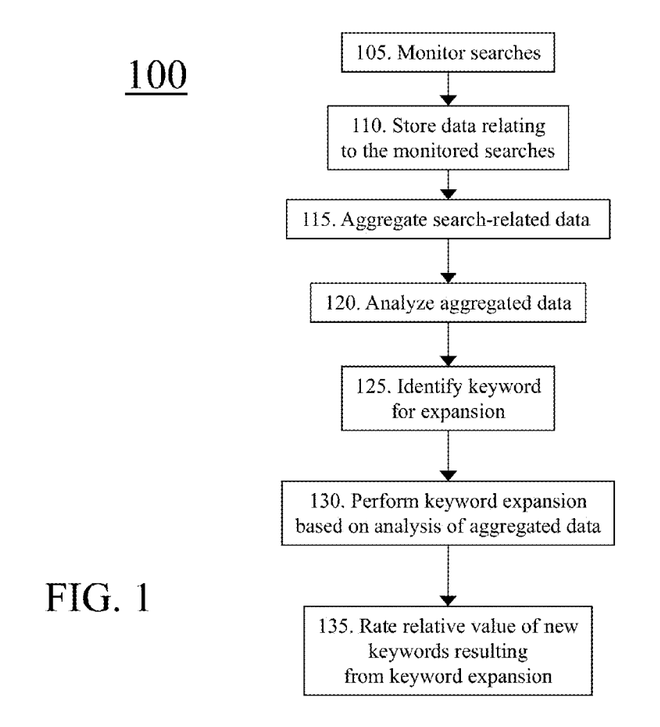
FIG. 1 is a flow diagram of a process for generating conceptual keyword expansions.

FIG. 1 is a flow diagram of a process 100 for generating conceptual keyword expansions. Large numbers of search queries received from a variety of different users or other sources are monitored (105), and data relating to the monitored search queries is stored (110). For example, a search engine website can collect information such as which search terms were used together in the same query or in a series of related queries, which websites were selected as a result of a particular query, and a particular time frame during which a search term or search query appears. Search queries can include, for example, a keyword, a group of keywords, a phrase, and/or other criteria. Search queries can include Boolean operators or other special instructions.

The stored data is aggregated (115) to provide statistics relating to search patterns. For example, these statistics may indicate how many times different search terms appeared together in the same query and/or in the same series of related queries, which search terms frequently appeared together in the same query, which websites are closely tied to particular search terms, and how many times a search term or search query appeared during a particular time frame. The stored data can be aggregated on a periodic basis (e.g., once a day or once a week), continuously (e.g., each time a search term or search query is received, one or more related statistics are adjusted accordingly), or upon request by an administrator. The stored data can be aggregated according to evolving aggregation criteria, which can evolve, for example, based on manual additions of criteria (e.g., to analyze new characteristics) and manual or automatic adjustments to existing criteria (e.g., to split a category of statistics into different subcategories). In addition, aggregation can be performed on limited subsets of data (e.g., separate data aggregations are generated for each month).

The aggregated data can be mined or otherwise analyzed (120) to identify patterns. Numerous different types of patterns can be identified. For example, the analysis can identify patterns relating to which search terms are frequently used in the same query, search terms that are used with increasing or decreasing frequency, which search terms most closely correspond to a particular website or type of website, and the most common misspellings of particular terms. If analyzed over a sufficient time period and/or number of samples, patterns can generally provide a reliable model of typical tendencies or other observable characteristics of search engine users.

Subsequently, a keyword can be identified for expansion (125). For example, a pay-per-click advertiser may consider one or more keywords to be of particular relevance to the advertiser, such that the advertiser wants to appear as a sponsored link in response to search queries that use the keywords. The advertiser, however, may want to expand the scope of searches that produce the sponsored link as a result. Accordingly, an expansion of the one or more keywords can be performed to identify other related keywords that might also be of interest to the advertiser. In some implementations, the analysis of aggregated data may be performed after identifying a keyword for expansion.

The results of analyzing the aggregated data can be used to determine which other keywords relate to the identified keyword (130). In some implementations, the related keywords can be categorized by subject matter. For example, the search term "American" might include a number of different related keywords, many of which can be categorized into either travel-related keywords (e.g., based on searches relating to American Airlines) or finance-related keywords (e.g., based on searches relating to American Express). In addition or as an alternative, a confidence score can be calculated for each related keyword to indicate a degree of confidence that the related keyword actually is related to the identified keyword. Thus, keywords that are determined to be related are not necessarily actually related. In some implementations, determining that a keyword is related can simply be an indication that the keywords are candidates in a keyword expansion process. As another example, the confidence score can be calculated based on a ratio of the number of times the related keyword appeared in association with the identified keyword to the total number of time the related keyword appeared.

One way of identifying related keywords and search patterns is to determine that different search terms in a particular search query are associated in some manner. Another way of identifying related keywords and search patterns is to group related search queries and determine that different search terms in the related search queries are associated in some manner. For example, one common search practice among many users of search engines is to first submit a relatively broad search query that returns too many results and/or results that are not particularly relevant to the user's area of interest. Accordingly, the user will frequently submit a new more limited search query within a short time of receiving the initial results. For example, a search for "Britney Spears" may frequently be followed by a search for "Britney Spears pictures" or "Britney Spears MP3." In such a situation, it is possible to infer an association between search terms from the different search queries. Such an association can further be used to determine that the search terms are related.

The related keywords identified based on the aggregated data can further be rated based at least in part on a relative value of each related keyword (135). The ratings can be based on a predefined scoring algorithm. The relative value can be a monetary value or an assessment of the significance of a particular keyword alone or in combination with other keywords. For example, the rating can be a ratio of a cost for the keyword in a pay-per-click advertising arrangement to frequency of use, as determined by examining the aggregated data. For purposes of keyword expansions, the rating can be used to recommend or give a higher weighting to keywords that have a low cost ratio over other similar keywords that have a higher cost ratio.

As another example, a keyword can be viewed as having a higher relative value based on usage trends. Keywords that are appearing in search queries with increasing frequency can have a higher relative value than keywords that have historically been more frequently used but that show little or no growth in usage. Using the aggregated data, reports can be generated to identify emerging search terms or search queries and/or to give a higher weight to emerging terms or queries in keyword expansions.

Figure 2:
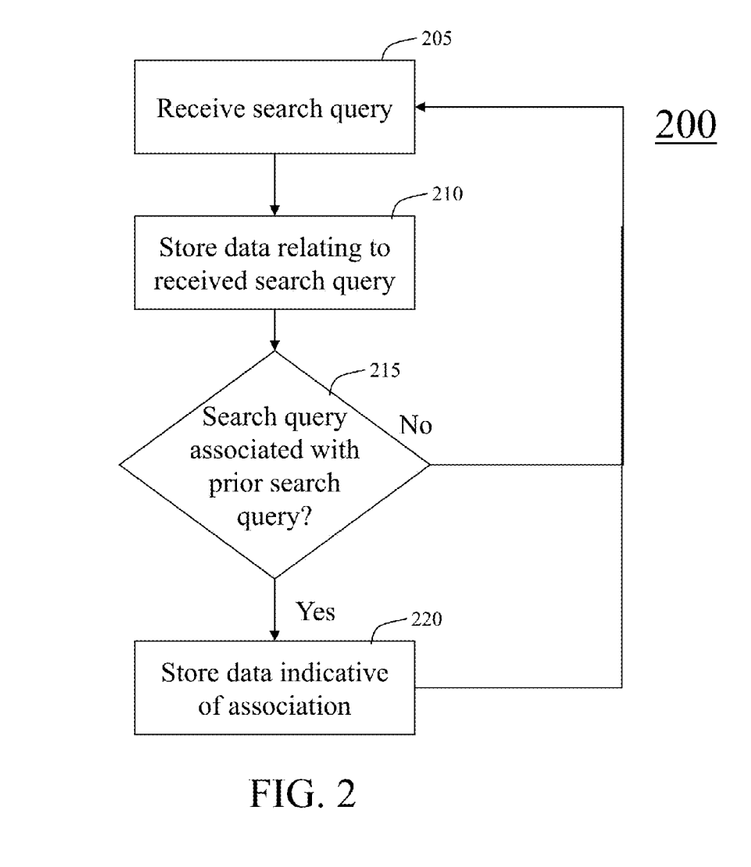
FIG. 2 is a flow diagram of a process for identifying associated search queries.

FIG. 2 is a flow diagram of a process 200 for identifying associated search queries. A search query is received (205), and data relating to the search query is stored (210). A determination (215) is made as to whether the search query is associated with one or more earlier search queries. This determination (215) can be made based on one or more of a variety of different factors. For example, an association between two search terms may be identified based on the two search terms each being separately used with a third search term. Alternatively, search queries can be associated with one another if they are submitted during the same search session.

A search session can be identified by monitoring an IP address from which different search queries are submitted during a relatively short time frame (e.g., thirty minutes) or in which no two consecutive search queries are received with more than a particular period between them. Search sessions can also be identified using cookies that serve to provide correlation information for multiple different search queries. In some cases, more sophisticated techniques can be used, such as evaluating a pattern of consecutive searches from a particular location to identify which queries are part of a single search session. This evaluation can be used, for example, to determine when a user has likely switched to a new search topic, such as by identifying consecutive searches that contain at least some common elements as related and identifying a new session if a search query that does not contain any elements in common with prior searches is received from the same user. In some implementations, however, it is not necessary to attempt to segregate unrelated search queries into different sessions because the aggregation of data and analysis of aggregated statistics will minimize the effect of unrelated search queries that are part of the same session.

If the search query is not associated with any earlier search queries, the process 200 continues receiving additional search queries (at 205). If the search query is associated with one or more earlier search queries (as determined at 215), data indicating the association is stored (220). The association can be indicated, for example, by storing data relating to the various associated search queries together, by creating an index of related search queries, by storing pointers with each search query that point to other related search queries, or by generating aggregated statistics indicating how many times different search terms appeared together in the same or related search queries. The process 200 then continues receiving additional search queries (at 205).

Figure 3:
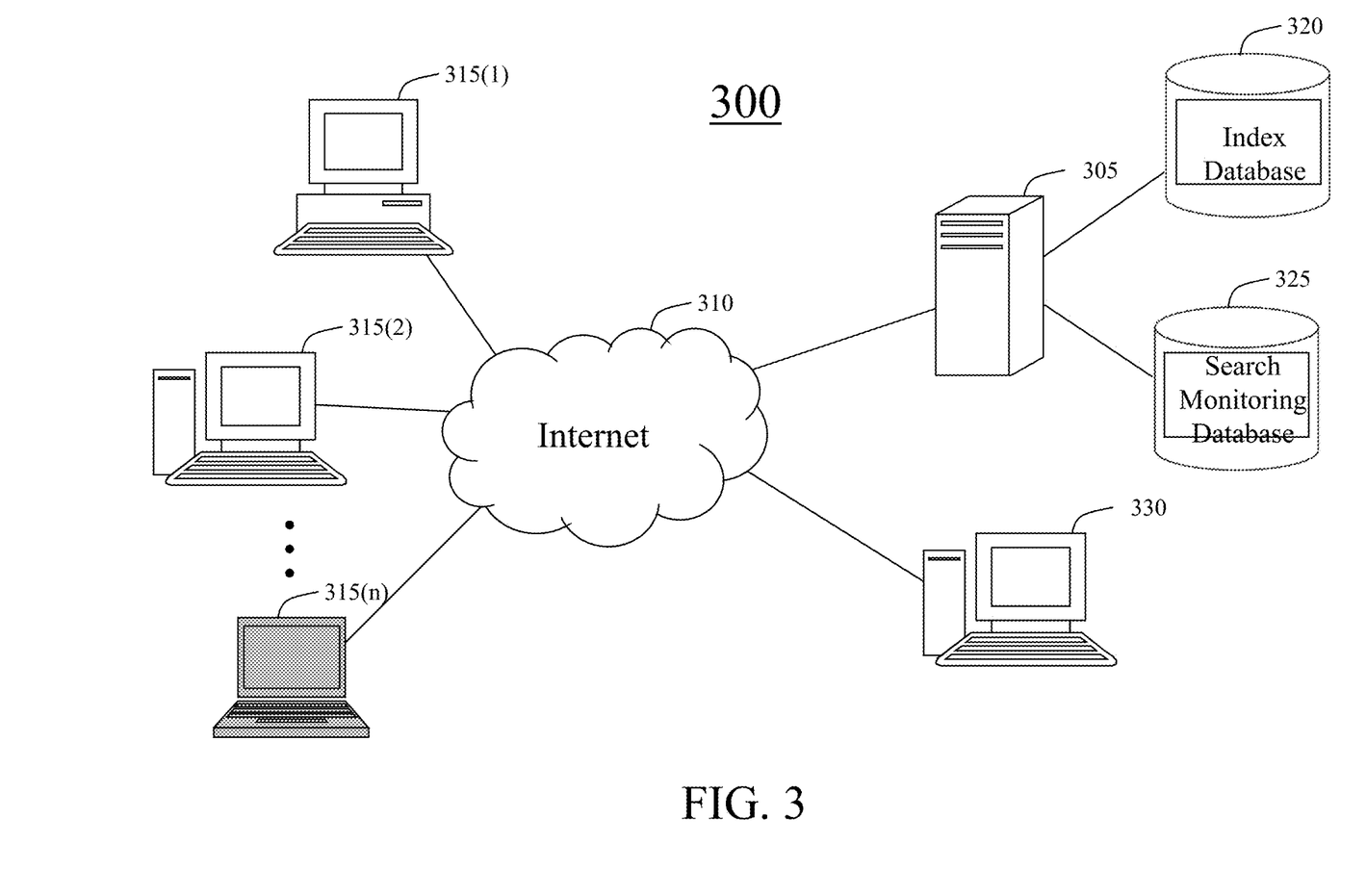
FIG. 3 is a block diagram of an exemplary system that can be used to implement a conceptual keyword expansion technique.

FIG. 3 is a block diagram of a system 300 that can be used to implement a conceptual keyword expansion technique. A search engine is implemented on server 305 that receives search queries sent through a network 310, such as the Internet, from a user device 315. A search engine can include computer software used to search data (e.g., files, documents, or websites) as text or in a database for specified information and/or that meets specific criteria. The search can be performed on a network, such as a private network or the Internet, or on a single device. Search engines can use a regularly updated (e.g., using spider software) index of data to look for entries that match search criteria entered by a user or can perform a search of potential target data in response to a search query.

The server 305 generates results for search queries based on indexing data stored in an index database 320. For example, the index database 320 stores an index of websites by keyword, and the server 305 determines which websites are the most relevant by comparing terms in a particular search query with the index. The results generally include a list of websites that correspond to the search query and that are sequenced according to a relative relevance of each website. The results are sent over the network 310 to the user device 315 from which the search query was received for presentation on a user interface. A user at the user device 315 can then select websites from the results list.

The server 305 stores data relating to the received search queries in a search monitoring database 325. The search monitoring database 325 can store information such as the search terms included in each search query, relationships among search terms included in the same search query or in related search queries, a date and time at which each search term is received, and which of the results for each search query are selected by a user from the results list. The search monitoring database 325 can store information for individual search queries or search sessions and/or can store aggregated data. In some implementations, data from the search monitoring database 325 can be aggregated by a different server and stored in a different database.

As numerous search queries are received from a large number of different user devices 315(1), 315(2), . . . , 315(n), aggregations of data can be generated that represent common search patterns. For example, if a user of a first user device 315(1) conducts a search session that incorporates similar search tendencies as a search session conducted by a user of a second device 315(2), it is possible to infer relationships between the search sessions or elements thereof or to infer that elements of the search sessions represent common search strategies or subject matter. Data relating to individual search queries or search sessions and/or aggregated data that is stored in the search monitoring database 325 can be accessed from an administrator device 330 for purposes of, for example, performing keyword expansions. The administrator device 330 can also be used to configure search monitoring settings and rules, to define what data relating to the search queries is stored, and to control how search query data is aggregated.

The administrator device 330 can be generally the same as the user devices 315 but may include additional software or permissions that enable access to the search monitoring database 325. Accordingly, the same functions can be performed from any of the user devices 315 assuming they include the proper software and/or permissions. Similarly, searches for which data is stored in the search monitoring database 325 can also be performed from the administrator device 330.

A variety of different types of conceptual keyword expansions can be performed using data stored in the search monitoring database 325. For example, the data can be used to identify different stems of the same base term (e.g., an analysis of the aggregated data may reveal that "runs," "ran," "running," etc. are all stems of the same base). The identification of different stems can be based, for instance, based on one user performing a search that includes a present tense verb, while another user performs a highly similar search that includes a past tense form of the same verb. The data can also be used to identify terms with a similar meaning in foreign languages.

The data can also be used to identify common misspellings of terms. For example, a search query received from a first user device 315(1) may include "britney spears," a search query received from a second user device 315(2) may include "britnee spears," and a search query received from another user device 315(n) may include "britnee speers." By using the common elements linking each search query to at least one other search query, common or possible misspellings can be identified, especially if the analysis of misspellings is conducted using a large number of received search queries, in which the same errors are repeated.

The data stored in the search monitoring database 325 can also be used to identify associations between terms that result from something other than merely being synonyms. As an example, monitoring search queries may reveal a relationship between the term "michael jordan" and "23," especially for searches that are directed at finding websites that include Michael Jordan's basketball statistics or that sell Michael Jordan basketball jerseys.

In general, conceptual keyword expansions can be used to help optimize a pay-per-click advertising plan by increasing the number of keywords that, when submitted as a search term, lead to a website being listed as a sponsored link and/or by identifying keywords that are most likely to be included in a search query by users targeted by the website. Such optimizations can be further improved by analyzing data that indicates emerging queries and relative cost per click data for different keywords.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the process steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 4:
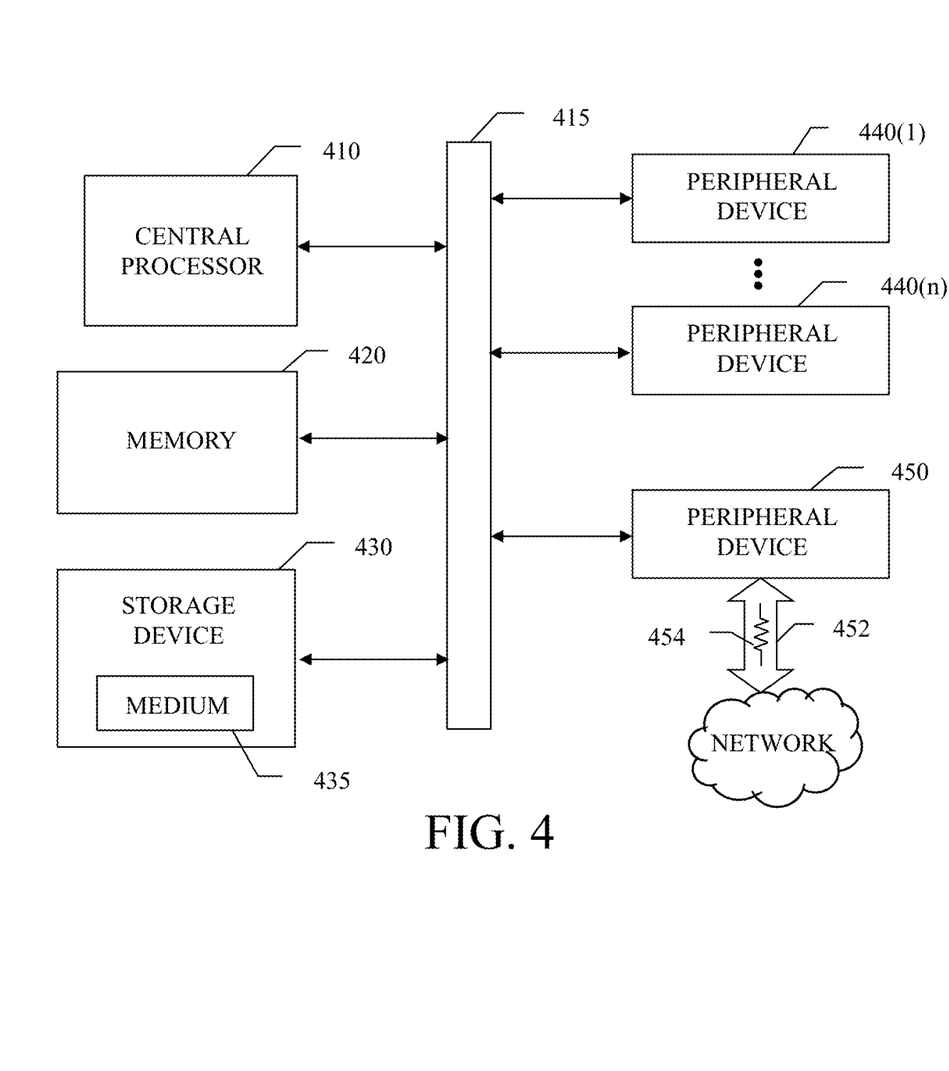
FIG. 4 is a block diagram illustrating an example data processing system.

FIG. 4 is a block diagram illustrating an example data processing system 400 in which aspects of the systems and processes described above can be implemented. The data processing system 400 includes a central processor 410, which executes programs, performs data manipulations, and controls tasks in the system 400. The central processor 410 is coupled with a bus 415 that can include multiple busses, which may be parallel and/or serial busses.

The data processing system 400 includes a memory 420, which can be volatile and/or non-volatile memory, and is coupled with the communications bus 415. The system 400 can also include one or more cache memories. The data processing system 400 can include a storage device 430 for accessing a storage medium 435, which may be removable, read-only, or read/write media and may be magnetic-based, optical-based, semiconductor-based media, or a combination of these. The data processing system 400 can also include one or more peripheral devices 440(1)-440(n) (collectively, devices 440), and one or more controllers and/or adapters for providing interface functions.

The system 400 can further include a communication interface 450, which allows software and data to be transferred, in the form of signals 454 over a channel 452, between the system 400 and external devices, networks, or information sources. The signals 454 can embody instructions for causing the system 400 to perform operations. The system 400 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 400 and/or delivered to the machine 400 over a communication interface. These instructions, when executed, enable the machine 400 to perform the features and functions described above. These instructions represent controllers of the machine 400 and can be implemented in a high-level procedural and/or object-oriented programming language, and/or in assembly/machine language. Such languages can be compiled and/or interpreted languages.

A number of implementations have been described. Nevertheless, it will be understood that various modifications may be made. For example, the described functions (e.g., depicted in and described with reference to FIGS. 1 and 2) need not be performed in the order described. Instead, some of the described functions can be performed in parallel or in a different order. In addition, the techniques can be implemented in systems other than that described and depicted. For example, data can be stored in any number of databases. Accordingly, other implementations are within the scope of the following claims.

What is claimed is:

1. A computer-implemented method comprising:
   accessing, from machine-readable storage, a plurality of search queries that were previously received within a predetermined time;
   receiving, at a computing device, information specifying a particular keyword;
   selecting, from among the plurality of search queries, a search query that was received within the predetermined time and that includes the particular keyword and one or more other keywords, wherein the search query comprises a plurality of keywords;
   selecting at least one of the one more other keywords from the selected search query that was received within the predetermined time, with selection of the at least one of the one more other keywords being based on:
      identifying one or more different stems of a base term of the particular keyword;
      identifying a misspelling of the particular keyword;
      analyzing collected data for search patterns that include the particular keyword; or
      identifying search term usage trends for the particular keyword or cost per click data for the at least one of the one more other keywords; and
   performing, by the computing device, keyword expansion on the particular keyword by assigning the at least one of the one more other keywords to a group of candidate keywords that are related to the particular keyword.

2. The method of claim 1, wherein accessing the plurality of search queries comprises identifying search queries performed within a search session.

3. The method of claim 2, further comprising identifying a set of search queries based on one or more of the search queries in the set being received from a particular location, wherein the search session comprises the set of search queries.

4. The method of claim 3, further comprising determining the particular location based on an originating address associated with the one or more of the search queries in the set.

5. The method of claim 3, further comprising determining the particular location based on data stored on a device from which the one or more of the search queries originates.

6. The method of claim 1, wherein accessing the plurality of search queries comprises identifying search queries with related elements.

7. The method of claim 1, wherein at least one of the candidate keywords comprises a search term included in a search query associated with the search query that includes the particular keyword.

8. The method of claim 1, further comprising identifying at least one of the candidate keywords by identifying different stems of a base term or identifying possible misspellings of a term.

9. The method of claim 1, further comprising identifying at least one of the candidate keywords by analyzing collected data for patterns of similar search tendencies.

10. The method of claim 1, further comprising rating the candidate keywords based on at least one of an identification of search term usage trends or a cost associated with each candidate keyword.

11. A system comprising:
    one or more processing devices; and
    one or more machine-readable storage devices storing instructions that are executable by the one or more processing devices to perform operations comprising:
       accessing a plurality of search queries that were previously received within a predetermined time;
       receiving, at a computing device, information specifying a particular keyword;
       selecting, from among the plurality of search queries, a search query that was received within the predetermined time and that includes the particular keyword and one or more other keywords, wherein the search query comprises a plurality of keywords;
       selecting at least one of the one more other keywords from the selected search query that was received within the predetermined time, with selection of the at least one of the one more other keywords being based on:
          identifying one or more different stems of a base term of the particular keyword;
          identifying a misspelling of the particular keyword;
          analyzing collected data for search patterns that include the particular keyword; or
          identifying search term usage trends for the particular keyword or cost per click data for the at least one of the one more other keywords; and
       performing, by the computing device, keyword expansion on the particular keyword by assigning the at least one of the one more other keywords to a group of candidate keywords that are related to the particular keyword.

12. The system of claim 11, wherein accessing the plurality of search queries comprises identifying search queries performed within a search session.

13. The system of claim 12, wherein the operations further comprise:
    identifying a set of search queries based on one or more of the search queries in the set being received from a particular location, wherein the search session comprises the set of search queries.

14. The system of claim 13, wherein the operations further comprise:
    determining the particular location based on an originating address associated with the one or more of the search queries in the set.

15. One or more machine-readable storage devices storing instructions that are executable by one or more processing devices to perform operations comprising:
    accessing a plurality of search queries that were previously received within a predetermined time;

receiving, at a computing device, information specifying a particular keyword;

selecting, from among the plurality of search queries, a search query that was received within the predetermined time and that includes the particular keyword and one or more other keywords, wherein the search query comprises a plurality of keywords;

selecting at least one of the one more other keywords from the selected search query that was received within the predetermined time, with selection of the at least one of the one more other keywords being based on:

identifying one or more different stems of a base term of the particular keyword;

identifying a misspelling of the particular keyword;

analyzing collected data for search patterns that include the particular keyword; or identifying search term usage trends for the particular keyword or cost per click data for the at least one of the one more other keywords; and performing, by the computing device, keyword expansion on the particular keyword by assigning the at least one of the one more other keywords to a group of candidate keywords that are related to the particular keyword.

16. The one or more machine-readable storage devices of claim 15, wherein accessing the plurality of search queries comprises identifying search queries performed within a search session.

17. The one or more machine-readable storage devices of claim 16, wherein the operations further comprise:

identifying a set of search queries based on one or more of the search queries in the set being received from a particular location, wherein the search session comprises the set of search queries.

18. The one or more machine-readable storage devices of claim 17, wherein identifying the set of search queries is further based on the one or more of the search queries in the set being performed within a predetermined time.

\* \* \* \* \*